United States Patent [19]

Sundholm

[11] Patent Number: 5,019,251

[45] Date of Patent: May 28, 1991

[54] FILTER APPARATUS WITH A SPRING LOADED SAFETY VALVE PLATE

[76] Inventor: Göran Sundholm, Magistervägen 34 B, SF-02700 Grankulla, Finland

[21] Appl. No.: 340,221

[22] Filed: Apr. 19, 1989

[30] Foreign Application Priority Data

Apr. 29, 1988 [FI] Finland .................. 882025

[51] Int. Cl.$^5$ .............................................. B01D 27/10
[52] U.S. Cl. .................................. 210/133; 210/136; 210/446
[58] Field of Search ............... 210/130, 133, 136, 137, 210/440, 443, 446, 448

[56] References Cited

U.S. PATENT DOCUMENTS

| | | | |
|---|---|---|---|
| 3,557,957 | 1/1971 | Baldwin | 210/130 |
| 3,853,763 | 12/1974 | Hall | 210/130 |
| 3,912,630 | 10/1975 | Reighard et al. | 210/130 |
| 4,207,187 | 6/1980 | Booth | 210/130 |
| 4,212,739 | 7/1980 | Hilton et al. | 210/130 |
| 4,575,422 | 3/1986 | Zimmer | 210/446 |
| 4,629,558 | 12/1986 | Garritty | 210/440 |
| 4,705,626 | 11/1987 | Morelli | 210/130 |

Primary Examiner—Robert A. Dawson
Assistant Examiner—Wanda L. Millard
Attorney, Agent, or Firm—Ladas & Parry

[57] ABSTRACT

The invention relates to a filter apparatus for filtering oil in particular. The object is to provide a filter apparatus reliable in operation and simple in construction. A spring-loaded (22) valve plate (18) is provided at one end (5) of a casing surrounding a tubular filter cartridge (2). The valve plate comprises, at a distance from its outer edge, an annular cutting edge (19) sealing against the end (5) of the casing. Oil flows radially inwards through the filter cartridge (2). When the filter (2) is gradually blocked by impurities, the pressure of the oil rises outside the filter cartridge. This pressure acts on an annular surface (31) between the outer edge and the sealing cutting edge (19) of the valve plate. When the pressure rises sufficiently, the valve plate is displaced away from the end (5) of the casing, whereby oil may flow through the connection so obtained past the filter (2) directly into its central cavity (11).

2 Claims, 3 Drawing Sheets

FILTER APPARATUS WITH A SPRING LOADED SAFETY VALVE PLATE

The present invention relates to a filter apparatus for filtering liquid, comprising a tubular filter element disposed within a casing, the liquid being preferably arranged to flow within the casing outside the filter element, through the filter wall and out through a central cavity of the filter element. The apparatus is intended especially for the filtration of oil in various hydraulic systems, for instance.

The filter element, usually a cylindrical tube open at least at its outlet end, is gradually blocked by impurities. If the change of the filter element is neglected, the pressure in the space between the casing and the filter element increases considerably, with the risk of explosion.

The object of the present invention is to provide a new filter apparatus of the type described above, which is simple in construction and reliable in operation.

The filter apparatus according to the invention is mainly characterized in that a spring-loaded safety valve comprising a valve plate is provided at one end of the casing, the valve plate comprising, at a distance from its outer edge, a seal member positioned against said end of the casing.

A narrow gap is left between the valve plate and the end of the casing, extending from the outer edge of the valve plate to the seal member. The seal member is preferably a circumferential cutting edge.

The pressure in the space between the casing and the filter element acts through this gap axially inwards on the valve plate across the area between the edge of the plate and the seal member. When this pressure increases sufficiently, the valve plate fails so that oil flows through the obtained connection past the filter directly into the outlet. The magnitude of the required pressure, that is, in other words, the difference between the pressure outside and inside the filter element, can be balanced by adjusting the load of the spring.

A spiral spring is preferably provided around the outer edge of the valve plate between the end of the filter element and the end of the casing. By means of the spiral spring, the filter element can be mounted flexibly, and oil can flow through the loops of the spiral spring when the safety valve is opened. The valve plate preferably comprises an axial cylindrical part for centering the filter element in a sealing manner. A similar plate with a circumferential spiral spring may be provided in close contact with the opposite end of the casing with respect to the safety valve.

The safety valve is preferably positioned at the upper end of the filter element.

In the following the invention will be described in more detail with reference to the attached drawings.

Figure 1:
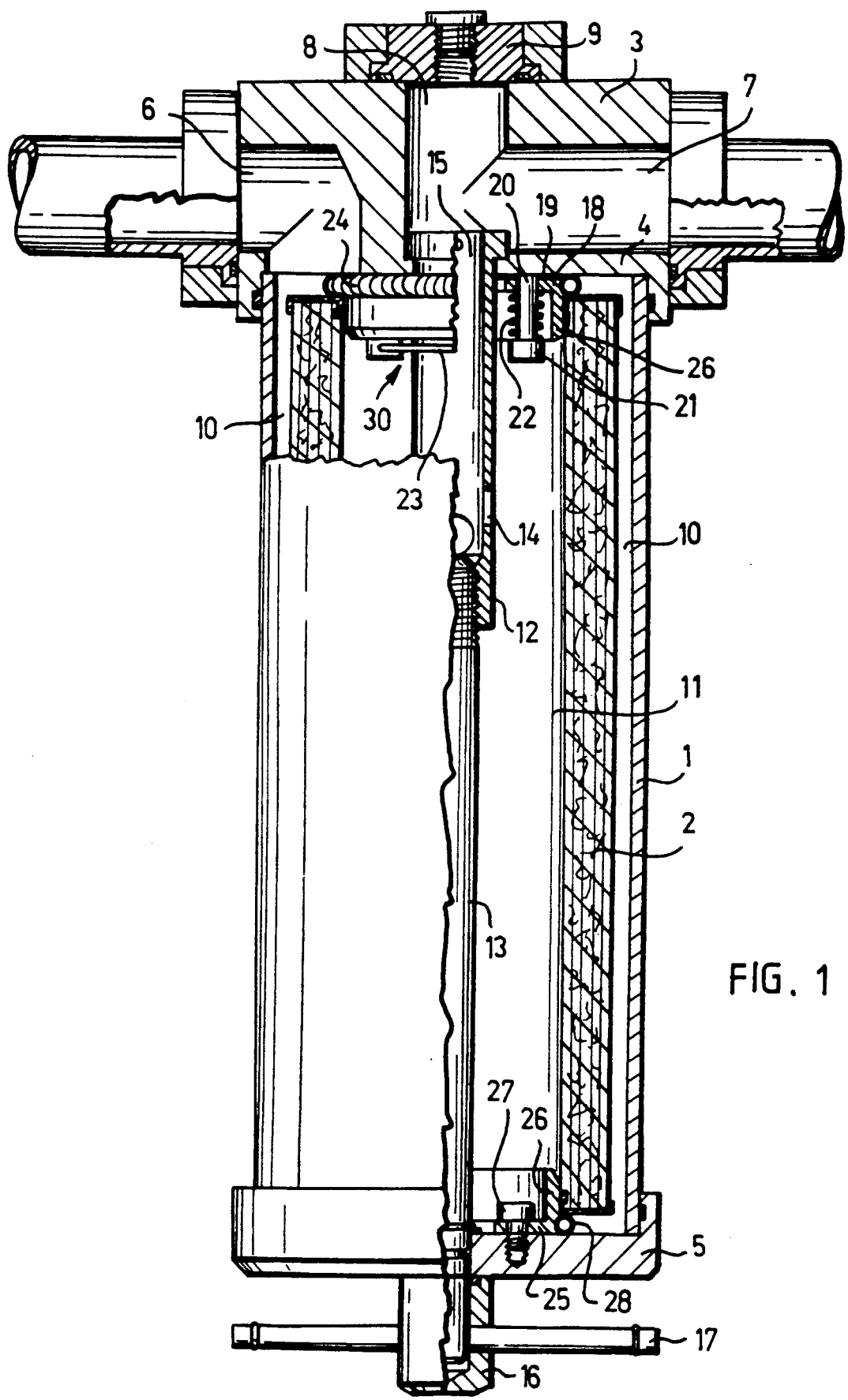
FIGS. 1 and 2 are partial longitudinal sectional views of two preferred embodiments in which the safety valve is positioned at different ends of the filter.
Figure 2:
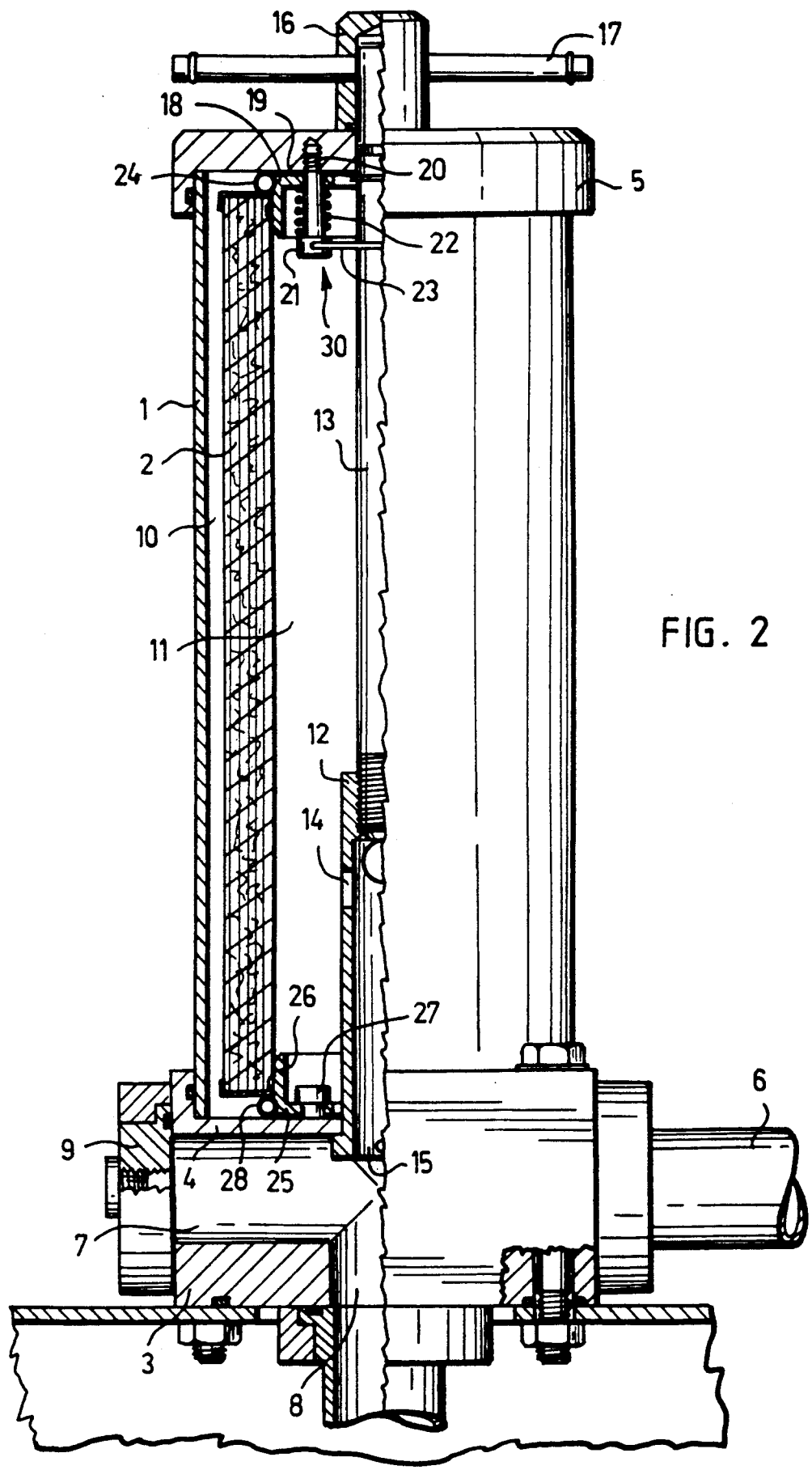

The reference numeral 1 designates a cylindrical tube around a similarly cylindrical filter element 2 called filter cartridge. The tube 1 together with an inner contact surface 4 in an end piece 3 and an opposite end piece 5 forms a casing around the filter cartridge 2. The end piece 3 comprises an inlet channel 6 and two outlet channels 7 and 8, of which the channel 8 in FIG. 1 and the channel 9 in FIG. 2 are closed by closure means 9.

The oil to be filtered flows in through the channel 6 into an annular space 10 between the tube 1 and the filter cartridge 2, through the filter cartridge 2 into its central cavity 11 and out through a central tubular channel 15, via openings 14 provided therein, into the channel 7.

A wall 12 in the tubular channel 15 comprises, at the inner end thereof, an internal threading for engagement with an external threading provided on a shaft journal 13 for mounting the end piece 5 in a sealing manner by means of a head 16 on the shaft journal 13, which is tightened with a handle 17.

A safety valve generally designated with 30 is provided at the upper end of the filter casing. The safety valve comprises a valve plate 18 provided with a seal member, preferably an annular cutting edge 19, positioned inwardly from the outer edge of the valve plate (appears from FIG. 3 in particular). The seal member 19 is positioned against the respective upper end 4 or 5 of the filter casing. The reference numeral 20 designates bolts screwed in the end of the casing. A spring 22 is positioned between the valve plate 18 and the head 21 of each bolt, which spring presses the valve plate against the end of the casing. The possible loosening of the bolts 20 due to vibration, for instance, is avoided by using a metal thread 23 going through the bolt heads 21, as appears from FIG. 4 in particular. A spiral spring 24 is provided around the valve plate 18 between the end of the filter cartridge 2 and the end of the surrounding casing. The valve plate 18 comprises an axial cylindrical part 26 for centering the filter cartridge 2 internally in a sealing manner.

Correspondingly, a plate 25 preferably identical with the valve plate 18 is mounted at the opposite end of the filter with respect to the safety valve 30. The plate 25 is secured to the end piece 3 and 4, respectively, by means of bolts 27, and a spiral spring is provided around it.

Figure 3:
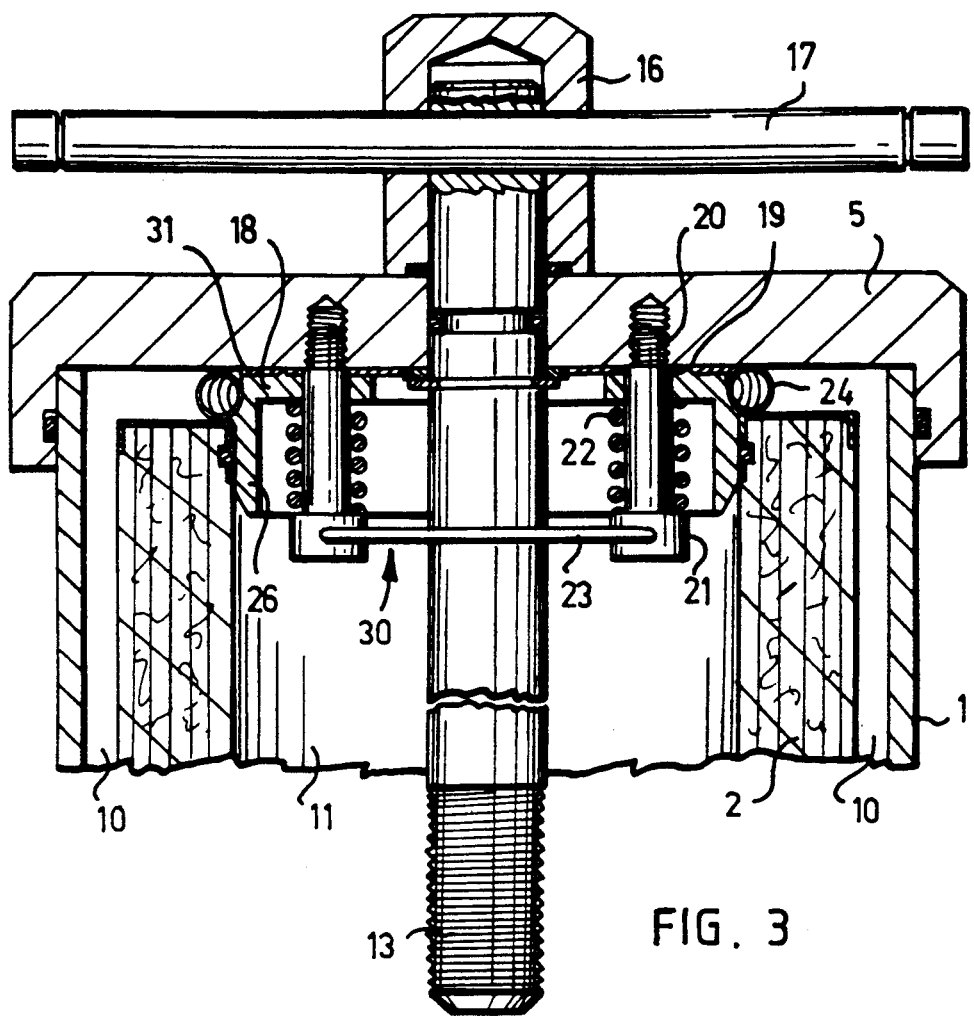
FIG. 3 is an enlarged longitudinal sectional view of the safety valve in the embodiment of FIG. 2.
Figure 4:
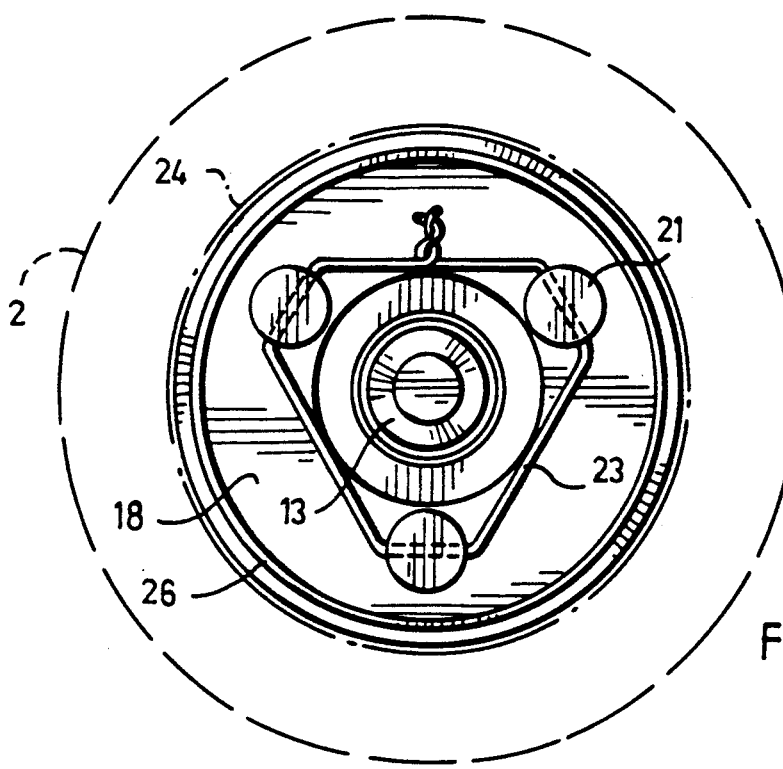
FIG. 4 is an end view of the safety valve.

When the filter cartridge 2 is gradually blocked by impurities, the pressure in the annular space 10 rises. This pressure acts on an annular surface 31 in the valve plate 18 outside the cutting edge 19. In FIG. 3, the reference numeral 24 designates a spring, even though it might look like a screwed surface between the valve plate 18 and the end piece 5. When the force caused by said pressure against the surface 31 increases sufficiently, the valve plate is displaced inwards against the springs 22, whereby oil flows through the loops of the spring 24 and through the connection so obtained directly into the cavity 11. An alarm device can be arranged to give a signal in a manner known per se when the safety valve is released.

I claim:

1. A filter apparatus for filtering liquid, comprising a tubular filter element disposed within a casing, the liquid being arranged to flow within the casing through the filter wall and out through a central cavity in said filter element, a spring-loaded safety valve plate being provided inside said casing at one end thereof and comprising, at a distance from its outer edge, a seal member positioned against said end of the casing and a cylindrical part extending axially into the filter element for centering said filter element in a sealing manner
wherein the tubular filter element is open at its both ends, a similar plate is provided at the opposite end of the casing with respect to the safety valve, said plate comprising a cylindrical part extending axially inwards within the casing for centering the filter element in a sealing manner, whereby the cylindrical part is surrounded by a spiral spring between the filter element and the end of the casing, the plate being secured in permanent close contact with the ends of the casing.

2. A filter apparatus for filtering liquid, comprising a tubular filter element disposed within a casing, the liquid being arranged to flow within the casing through the filter wall and out through a central cavity in said filter element, a spring-loaded safety valve plate being provided inside said casing at one end thereof and comprising, at a distance from its outer edge, a seal member positioned against said end of the casing and a cylindrical part extending axially into the filter element for centering said filter element in a sealing manner wherein a spiral spring is arranged around the valve plate between the filter element and the end of the casing, the tubular filter element being open at its both ends, a similar plate is provided at the opposite end of the casing with respect to the safety valve, said plate comprising a cylindrical part extending axially inwards within the casing for centering the filter element in a sealing manner, whereby the cylindrical part is surrounded by a spiral spring between the filter element and the end of the casing, the plate being secured in permanent close contact with the ends of the casing.

* * * * *